United States Patent
Doddipatla

(10) Patent No.: US 10,013,973 B2
(45) Date of Patent: Jul. 3, 2018

(54) SPEAKER-ADAPTIVE SPEECH RECOGNITION

(71) Applicant: KABUSHIKI KAISHA TOSHIBA, Tokyo (JP)

(72) Inventor: Rama Doddipatla, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/407,663

(22) Filed: Jan. 17, 2017

(65) Prior Publication Data

US 2017/0206892 A1 Jul. 20, 2017

(30) Foreign Application Priority Data

Jan. 18, 2016 (GB) .................................. 1600842.7
Jan. 11, 2017 (GB) .................................. 1700489.6

(51) Int. Cl.
*G10L 15/16* (2006.01)
*G10L 15/06* (2013.01)
(Continued)

(52) U.S. Cl.
CPC ............ *G10L 15/063* (2013.01); *G10L 15/02* (2013.01); *G10L 15/065* (2013.01); *G10L 15/16* (2013.01);
(Continued)

(58) Field of Classification Search
CPC ..... G10L 15/063; G10L 15/02; G10L 15/065; G10L 15/16; G10L 21/0216; G10L 15/07
(Continued)

(56) References Cited

U.S. PATENT DOCUMENTS 6,519,561 B1 * 2/2003 Farrell ................... G10L 15/07
704/232
2015/0161994 A1 6/2015 Tang et al.
(Continued)

FOREIGN PATENT DOCUMENTS

EP  0342630 A2  11/1989
EP  3076389 A1  10/2016
(Continued)

OTHER PUBLICATIONS

Combined Search and Examination Report issued by the British Intellectual Property Office dated Jul. 5, 2016, for GB application 1600842.7.
(Continued)

*Primary Examiner* — Jakieda Jackson
(74) *Attorney, Agent, or Firm* — Finnegan, Henderson, Farabow, Garrett & Dunner, L.L.P.

(57) ABSTRACT

A method for generating a test-speaker-specific adaptive system for recognising sounds in speech spoken by a test speaker; the method employing:
(i) training data comprising speech items spoken by the test speaker; and
(ii) an input network component and a speaker adaptive output network, the input network component and speaker adaptive output network having been trained using training data from training speakers;
the method comprising:
(a) using the training data to train a test-speaker-specific adaptive model component of an adaptive model comprising the input network component, and the test-speaker-specific adaptive model component, and
(b) providing the test-speaker-specific adaptive system comprising the input network component, the trained test-
(Continued)

speaker-specific adaptive model component, and the speaker-adaptive output network.

18 Claims, 9 Drawing Sheets

(51) Int. Cl.
*G10L 15/065* (2013.01)
*G10L 15/02* (2006.01)
*G10L 21/0216* (2013.01)
(52) U.S. Cl.
CPC .... *G10L 21/0216* (2013.01); *G10L 2015/022* (2013.01); *G10L 2015/0635* (2013.01)
(58) Field of Classification Search
USPC ........................................................ 704/232
See application file for complete search history.

(56) References Cited

U.S. PATENT DOCUMENTS

2016/0034811 A1 2/2016 Paulik et al.
2016/0260428 A1 9/2016 Matsuda et al.

FOREIGN PATENT DOCUMENTS

WO WO 2015/079885 A1 6/2015
WO WO 2016/054304 A2 4/2016

OTHER PUBLICATIONS

Search and Examiner Report in related UK application GB1700489.6, dated Jul. 11, 2017 (6 pages).
Mimura et al., "Unsupervised Speaker Adaptation of DNN-HMM by Selecting Similar Speakers for Lecture Transcription," Transactions of the Institute of Electronics, Information and Communication Engineers (2015), J 98:1411-18.

* cited by examiner

SPEAKER-ADAPTIVE SPEECH RECOGNITION

FIELD

The present disclosure relates to methods and systems for recognising sounds in speech spoken by an individual. The systems may be components of apparatus for taking actions based on the recognised sounds.

BACKGROUND

In recent years progress has been made in devising automatic speech recognition (ASR) systems which receive input data (generated by a microphone) which encodes speech spoken by a speaker—here referred to as a "test speaker"- and from it recognise phonemes spoken by the test speaker. A phoneme is a set of one or more "phones", which are individual units of sound. Typically, the input data is initially processed to generate feature data indicating whether the input data has certain input features, and the feature data is passed to a system which uses it to recognise the phones. The phones may be recognised as individual phones ("mono-phones"), or pairs of adjacent phones ("di-phones"), or sequences of three phones ("triphones").

Since multiple individuals speak in different respective ways, it is desirable for the system which recognises the phones to be adapted to the speech of the test speaker, and for the adaptation to be performed automatically using training data which is speech spoken by the test speaker.

Desirably, the volume of training data which the test speaker is required to speak should be minimised. For that reason, conventional ASR systems are trained using data from many other speakers ("training speakers") for whom training data is available. Since there is huge amount of speaker variability in the data used for training the system, the performance can be very poor for an unknown test speaker. Speaker adaptation, which either transforms the features of the test speaker to better match the trained model or transforms the model parameters to better match the test speaker, has been found to improve the ASR performance.

Many adaptive systems are known. Recently there has been increasing interest in so-called deep neural networks (DNN). A deep neural network is an artificial neural network with more than one hidden layer between the input and output layers. Each layer is composed of one or more neurons, and each neuron performs a function of its inputs which is defined by a set of network parameters, such as numerical weights. DNNs are typically designed as feedforward networks, although recurrent forms of DNN also exist. In feedforward networks, each neuron in the first layer of neurons receives multiple input signals; in each successive layer, each neuron receives the output of multiple neurons in the preceding layer.

Speaker adaptive training (SAT) is an approach to perform speaker adaptation in ASR, where speaker variability is normalized both in training and recognition. SAT improves acoustic modelling and can be helpful both in DNN-based automatic speech recognition (ASR) and speech synthesis. Speaker adaptation in DNNs is performed either by transforming the input features before training the DNN or by tuning parameters of the DNN using the test speaker specific data. A wide range of systems have been proposed using both approaches. For approaches that focus on transforming the input features before training the DNN, the primary drawback is that the DNN has to be re-trained once a new feature transformation is applied. Whereas for approaches that focus on tuning the network parameters, the DNN typically requires more adaptive parameters, so the primary challenge is to tune the network parameters with the limited available data from the test speaker.

SUMMARY OF THE INVENTION

An invention is set out in the claims.

BRIEF DESCRIPTION OF THE DRAWINGS

An example of the invention will now be described with reference to the following drawings in which.

DETAILED DESCRIPTION

Figure 1:
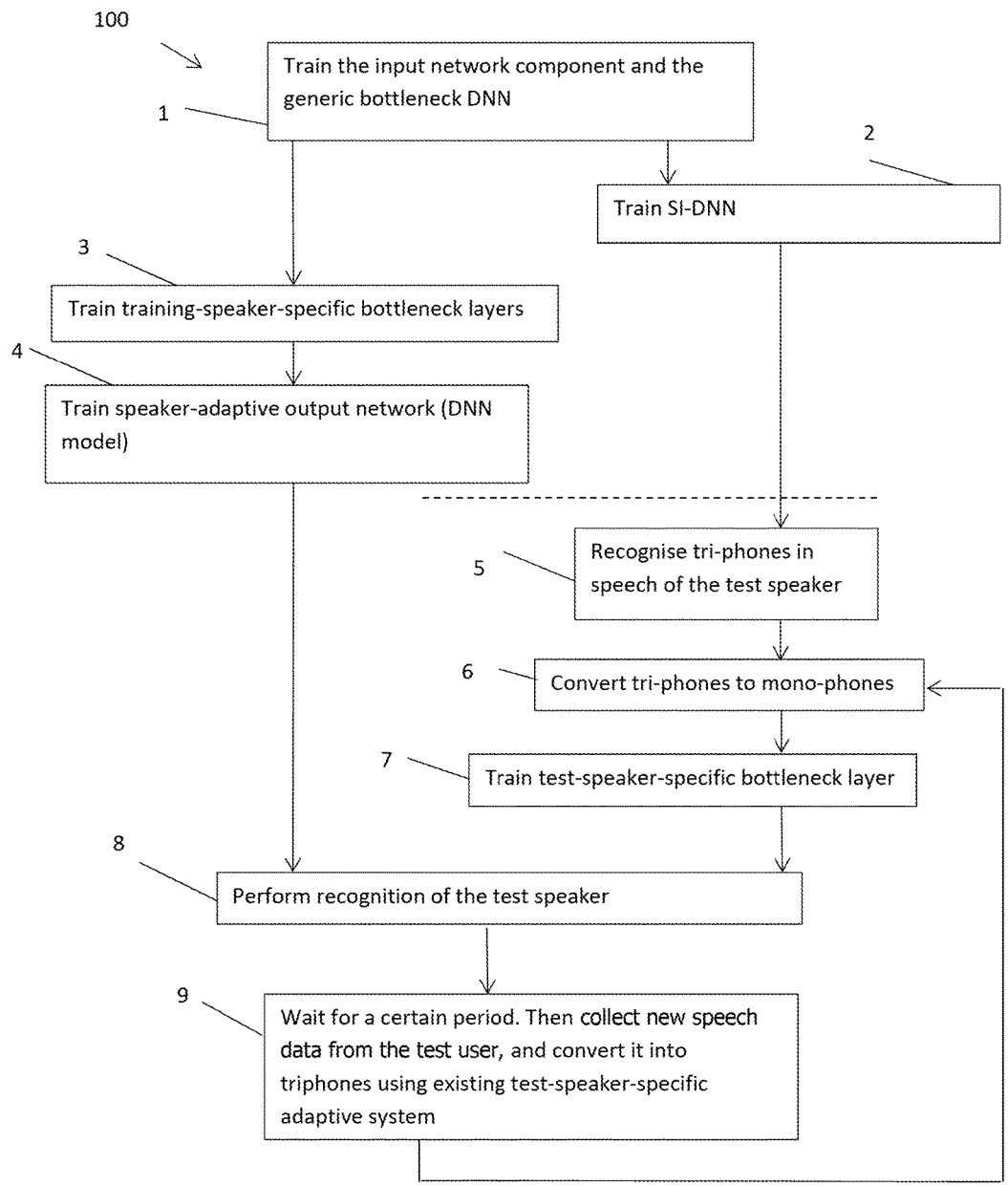
FIG. 1 is a flow diagram of steps of a first method to produce a test-speaker-specific adaptive system.

According to one example, the present disclosure proposes that an adaptive model component is provided for each of a number of training speakers. Each adaptive model component is trained, as part of an adaptive network having an input network component (typically a plurality of layers of neurons) and the adaptive model component, using training data for the corresponding training speaker. Thus, for each of the training speakers, a corresponding training-speaker-specific adaptive model component is formed.

The input network component may be trained in advance as part of an adaptive model comprising the input network component and an adaptive model component. The input network component and adaptive model component are trained by supervised learning using speech from the training speakers. Furthermore, during this process the adaptive model component is trained to be a generic (that is, speaker-independent) adaptive model component.

At least part of the input network component (e.g. a final layer of the input network component) may be modified after this, and before the input network component is used, using noise-specific training data for a plurality of training speakers with a selected noise characteristic. That plurality of training speakers may be the same as, or overlap with, the pluarlity of training speakers whose training data was used to generate the input network. The noise characteristic may be selected based on the measured noise environment of the test speaker. Optionally, the generic adaptive model component may be updated also based on the noise-specific training data.

Preferably, the adaptive network also includes an adaptive output network component (at least one further layer of neurons) receiving the output of the adaptive model component. However, this is not necessary, since examples of the invention may be formed in which the adaptive model component is used to produce outputs which are directly indicative of a phone, e.g. a mono-phone. For example, outputs which can be formatted by a non-adaptive output layer as a signal indicating a mono-phone.

Then, a speaker-adaptive DNN model (also referred to here as a speaker-adaptive output network) is trained, successively using each of the training-speaker-specific adaptive model components and training data for the corresponding training speaker. During the training, the output of the input network component is transmitted to the training-speaker-specific adaptive model components, and may also be transmitted to the trained generic adaptive model component. The speaker-adaptive DNN model (speaker-adaptive output network) receives the output of the training-speaker-specific adaptive model component, and optionally also of the trained generic adaptive model component.

When training data is available for a test speaker, a further adaptive model is formed comprising the input network component, an adaptive model component and the output network component (if any). Within this further adaptive model, the adaptive model component is trained using the training data for the test subject. Thus, the adaptive model component becomes specific to the test subject.

A test-speaker-specific adaptive system is formed from the input network component, the trained test-speaker-specific bottleneck layer, and the speaker-adaptive DNN model. Note that the input network component and the speaker-adaptive DNN model do not have to be changed using the training data for the test speaker: they are both formed solely using the training data for the training speakers, as described above. The test-speaker-specific adaptive system is well-adapted for recognising the speech of the test speaker. The test-speaker-specific adaptive system may further include the trained generic adaptive model component, which is arranged to receive the output of the input network component, and transmit an output to the speaker-adaptive DNN model.

The adaptive model components have the same size for each of the training speakers and the test speaker. They may have a much smaller number of network variables than the number of variables of the speaker-adaptive DNN model, the input network component or the output network component (if any).

For this reason, the amount of training data for the test speaker which is needed to train the test-speaker-specific adaptive model component is low: much lower than the amount of training data from the training speakers which is used to obtain the speaker-adaptive DNN model. In other words, an example of the invention may be used when there is little data available from the test speaker.

For example, each adaptive model component may be defined by fewer than 10%, or even fewer than 5%, of the number of neurons in the input network component. Similarly, it may contain fewer than 10%, or even fewer than 5%, of the number of neurons of the speaker-adaptive DNN model.

Each adaptive model component may be a single layer in which each of neurons receives outputs of the input network component. For that reason, the adaptive model component may be referred to as a "bottleneck layer", since it may form a layer of the complete test-speaker-specific adaptive layer which has a smaller number of neurons than either a layer of the input network component or a layer of the speaker-adaptive DNN model.

The input network component and the speaker-specific adaptive model component (together referred to as the "first stage") primarily act as a feature extractor, to provide input for the speaker-adaptive DNN ("second stage"). The number of neurons in the hidden layers of the first stage, and particularly the number of neurons in the adaptive model component, can be much smaller than the dimension of the hidden layers in the speaker-adaptive DNN (second-stage DNN). This means that, there are fewer parameters for estimation and can be very helpful for online recognition (e.g. during recognition of the test speaker, the system can be tuned to perform better, using as little as one minute of speech data from the test speaker).

The input network component, and output network component (if any), of the adaptive model used to train the training-speaker-specific adaptive model components are preferably produced during an initial training procedure in which an adaptive model comprising the input network component, a generic adaptive model component and the output network component (if any), is trained using the training data for the training speakers.

In this training procedure, and/or in the subsequent training procedure in which the training-speaker-specific adaptive model components are produced, and/or in the subsequent procedure in which the test-speaker-specific adaptive model components are produced, the adaptive model is preferably trained to produce signals indicating mono-phones. However, this is merely an option. For example, it is alternatively possible for the example of the invention to use triphones in each step.

By contrast, during the training procedure which produces the speaker-adaptive DNN, the speaker-adaptive DNN may be trained to generate signals indicating tri-phones.

The training data for the test speaker may take the form of data comprising a series of recorded utterances from the test speaker, and associated phones (i.e. the training method uses training data for the speaker in which the sounds have already been decoded as phones), preferably triphones. In this case, the training of the test-speaker-specific adaptive model component may be supervised learning.

Alternatively, the training data for the test speaker may not include the associated phones (i.e. the training method does not employ training data for the test speaker in which the sounds have already been decoded as phones). In this case, the algorithm may include a preliminary step of using each element of the training data for the test speaker to produce a corresponding first estimate ("first pass") of the associated phones.

This first estimate may be in the form of triphones. Conveniently, this may be done by feeding the training data for the test subject into an adaptive network comprising the input network component, the trained generic adaptive model component, and a "speaker independent" DNN, which has been trained, successively using training data from the training speakers, to generate triphones using the output of the trained generic adaptive model component. The output of the adaptive network is the first estimate of the associated triphone. The test data for the test speaker, and the associated first estimate of the associated triphone, are then used to train the test-speaker-specific adaptive model component in a supervised learning process. In other words, although the training procedure as a whole is unsupervised (since it does not use training data for the test speaker in which the sounds have already been decoded as phonemes), the step of generating the test-speaker-specific adaptive model may be performed using a supervised learning algorithm.

In all of the adaptive networks discussed above, the signals input to the input network component are typically the output of a filter bank which identifies features in the speech of the user captured by a microphone. The speech of the test speaker is captured using a microphone, and passed through the filter bank before being transmitted to the input network component of the test-speaker-specific adaptive model.

The proposed approach facilitates integration of feature transformation approaches with approaches which tune the model parameters for DNNs to perform speaker adaptation.

Optionally, the training data for the training speakers may be pre-generated data stored in a database. If this training data is stored in the form of data which was output by the filter bank, then the filter bank does not need to be used again during the training process which produces the training-speaker-specific adaptive network component, and the speaker-adaptive DNN.

The proposed approach has been shown to improve performance when the test-speaker-specific bottleneck is generated by both supervised and unsupervised adaptation.

Optionally, the step of generating the test-speaker-specific adaptive model component may be repeated at intervals, and the test-speaker-specific adaptive network is updated with the most recent test-speaker-specific adaptive model component. In this way, the test-speaker-specific adaptive network may be updated for changes in the acoustic environment of the test speaker. The updating process may be performed on a predefined timetable (e.g. at regular intervals), or following a step of automatically detecting that an update would be beneficial.

The invention may be expressed in terms of a computer-implemented method of generating the test-speaker-specific adaptive system, or a computer system for performing the method, or a computer program product (such as a tangible data storage device) include program instructions (e.g. in non-transitory form) for causing a computer system to perform the methods.

Optionally, the invention may be expressed only in terms of the steps carried out using the training data from the test speaker. This is because the steps using the training data from the training speakers may be carried out in advance, and optionally by a different computer system.

The invention may furthermore be expressed as a method or a system for using the test-speaker-specific adaptive system to recognise speech from the test speaker. The recognised speech may be converted into words. The method or system may use those words to select actions, and optionally perform those actions.

Figure 9:
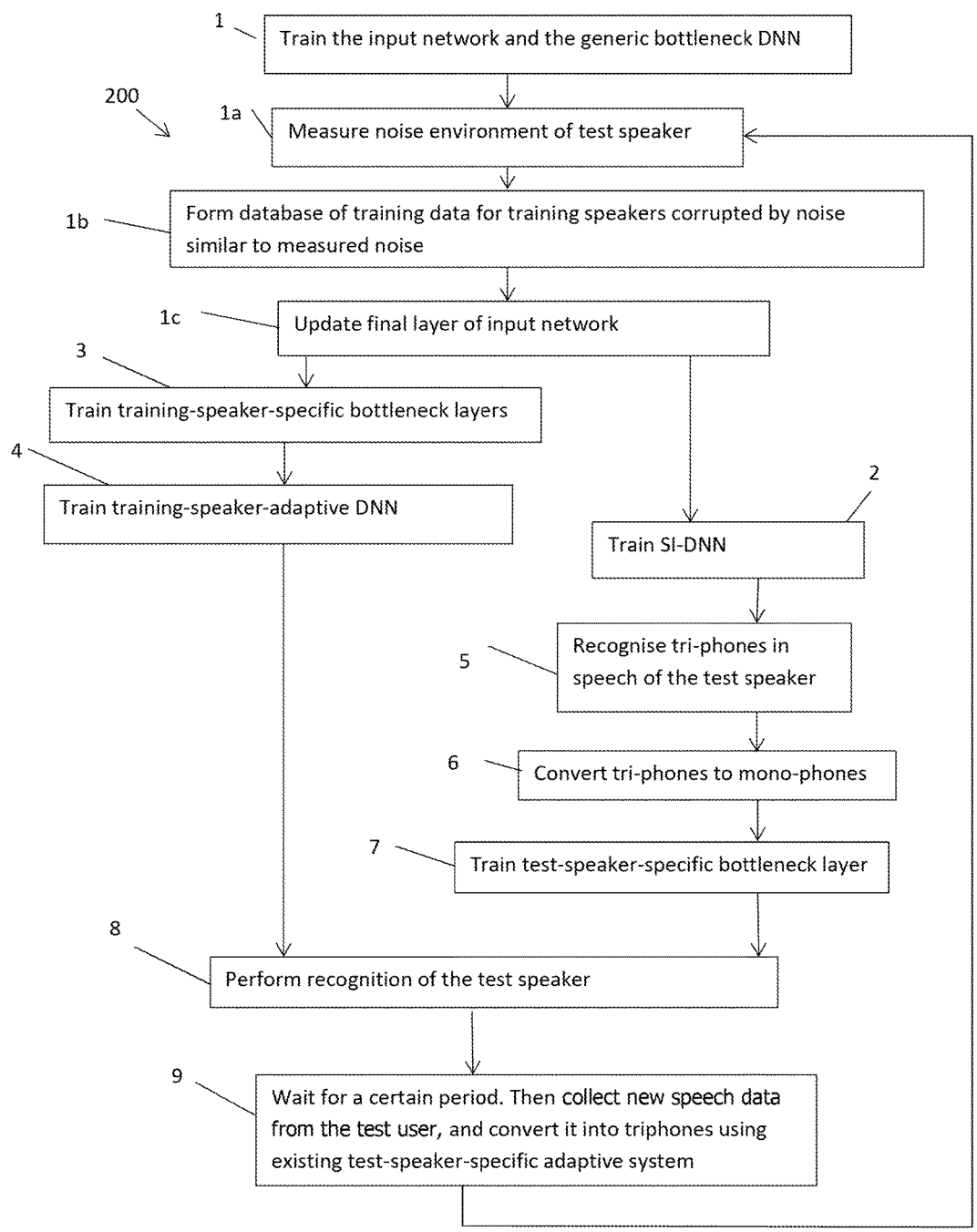
FIG. 9 is a flow diagram of a second method to produce a test-speaker-specific adaptive system.

Referring to FIG. 1, a flow-diagram is shown of a first method 100 which is an example of the invention. FIG. 9 is a flow diagram of a second method which is an example of the invention.

Figure 2:
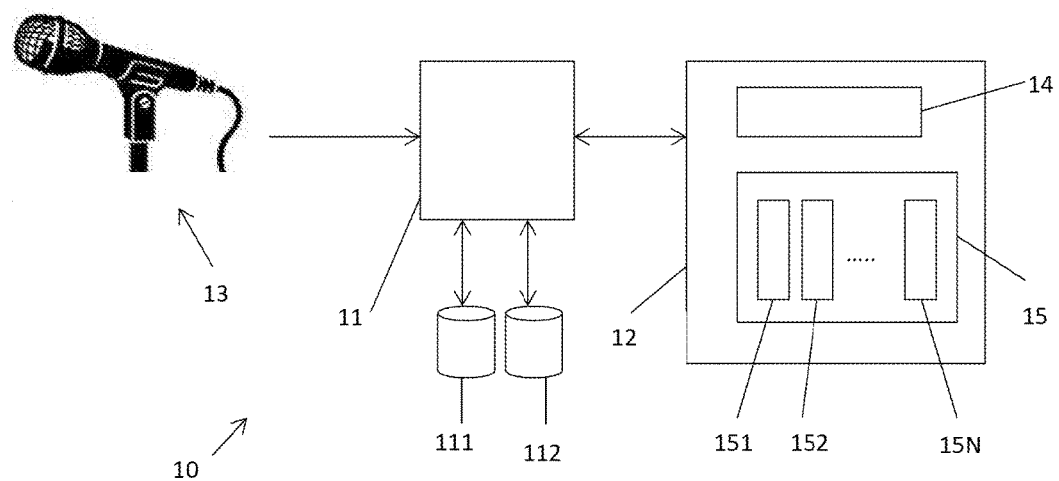
FIG. 2 illustrates schematically a computer system for performing the method of FIG. 1.

The methods 100, 200 may be performed by a computer system 10 shown in FIG. 2. The computer system includes a processor 11, a data storage system 12 and a microphone 13. The processor 11 is controlled by program instructions in a first memory device 111, and generates data which it stores in a second memory device 112. The computer system 10 may, for example, be a general computer system, such as a workstation PC (personal computer) or tablet computer. Alternatively, the processor 11 may be a processor of a server system. In another possibility the processor 11 may be a portion of a larger apparatus which it is desired to provide with ASR capability, such as a car, or an item of home or office equipment.

The data storage system 12 is for storing training data. It includes a first database 14 which is used for storing training data for a test speaker. The forms this training data may take are described below. The data storage system 12 further includes a database 15 for storing training data for N test speakers, labelled i=1, . . . N. The database 15 is divided into N respective sections 151, 152, . . . 15N, which respectively store training data for each of the N training speakers.

The training data for each training speaker stored in the corresponding one of the database sections 151, 151, . . . 15N, consists of a first portion which is raw sound data recorded by a microphone. The sound data is divided into successive portions referred to here as frames. The training data further includes a second portion which, for each frame indicates the phone which the training speaker spoke at the corresponding time. The frames are of equal length, and each frame is associated with one mono-phone or tri-phone. The first portion of the data may have been recorded by the microphone 13. Alternatively, the first and second portions of the data may have been obtained from a pre-existing database, such as one generated by a third party.

A. Method 100

1. Training the Bottleneck DNN (Step 1 of FIG. 1)

Figure 3:
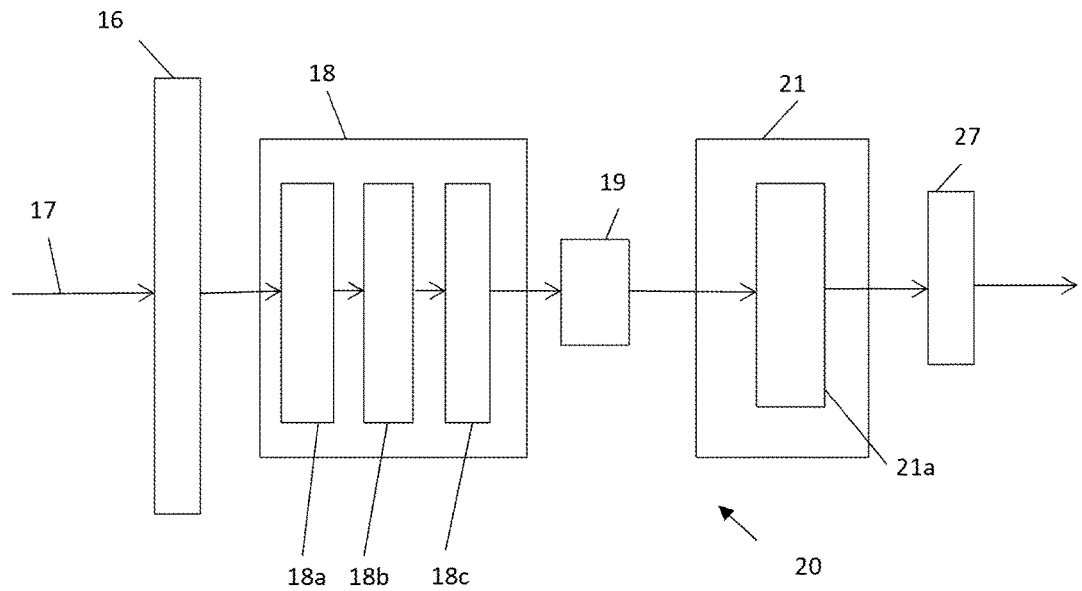
FIG. 3 illustrates an adaptive model which is trained in a step of the method of FIG. 1.

The first step (step 1) of the method of FIG. 1 is performed using an adaptive system 20 as illustrated in FIG. 3. The adaptive system 20 exists only virtually in the computer system 1. It receives the output of a filter bank (FBANK) 16 for receiving and processing raw sound data 17. As mentioned below, as step 1 is carried out, the raw sound data 17 is successively drawn from the raw sound data in the first portions of the database sections 151, 152, . . . , 15N. At any instant, the raw sound data input to the FBANK 16 is one of the frames.

The filter bank FBANK 16 may be a mel FBANK. However, in variations of the example of the invention described below, the FBANK 16 may be replaced, throughout the following description by one of (i) a mel FBANK plus a D-vector unit (a D-vector is an additional component appended to the FBANK features. This is described in Ehsan Variani, Xin Lei, Erik McDermott, Ignacio Lopez Moreno and Jorge Gonzalez-Dominguez, "Deep neural networks for small footprint text-dependent speaker verification" in IEEE International Conference on Acoustics, Speech and Signal Processing (ICASSP), 2014, 2014, (ii) a mel FBANK plus a constrained maximum likelihood linear regression (CMLLR) unit (this is described in S. P. Rath, D. Pavey, K. Vesely and J. Cernocky, "Improved feature processing for deep neural networks", in Proc. of INTERSPEECH, 2013; note that CMLLR is not an appended feature like a D-vector), or (iii) a mel FBANK plus a CMLLR unit and a D-vector unit.

The FBANK 16 identifies whether a plurality of features are present in the raw sound data it receives at any time (a "sound item"). It generates a plurality of output signals which indicate whether these features are present in the sound item.

The plurality of output signals of the FBANK 16 are fed to inputs of an adaptive input network component 18, which is typically a DNN. The input network component 18 depicted in FIG. 3 has three layers 18a, 18b, 18c, but in variations of the example of the invention there may be any integer number of layers. Each of these layers has a plurality of neurons, e.g. 512 neurons per layer. Each neuron receives multiple inputs and generates one output. Each neuron of the first layer 18a receives all the outputs of the FBANK 16. Each of the neurons in the second layer 18b receives the outputs of all the neurons in the first layer 18a. Each of the neurons in the third layer 18c receives the outputs of all the neurons in the third layer 18b.

The outputs of the input network component 18 (i.e. the respective outputs of the neurons in the third layer 18c) are fed to an adaptive model component 19 referred to as a "bottleneck layer" 19. The bottleneck layer 19 is a single layer of neurons which each receive all the outputs of the input network component 18 (i.e. the outputs of the neurons in layer 18c). The number of neurons in the bottleneck layer 19 is much lower than in each layer of the input network component 18. For example, there may be just 75 neurons in the bottleneck layer 19.

The outputs of the neurons in the bottleneck layer 19 are fed as inputs to an adaptive output network component 21. This consists, in this example, of a single layer 21a, which may contain 512 neurons.

The outputs of the output network component 21 are fed to a non-adaptive output layer 27 which formats the outputs of the output network component 21, to produce a signal indicative of a single monophone.

The input network component 18, the bottleneck layer 19 and the output network component 21 are collectively referred to here as a bottleneck DNN (BN-DNN).

Each of the neurons in the layers 18a, 18b, 18c, 19 and 21a forms a respective output which is a function of its inputs, such as a weighted sum of its inputs. The weights are variable parameters. The number of neurons in the bottleneck layer 19 is much lower than in any of the layers 18a, 18b, 18c or 21a (e.g. no more than 20% of the neurons in any one of those layers), and thus only a very small proportion of the total network parameters are associated with the bottleneck layer 19.

In step 1, the adaptive system 20 is trained to associate the raw speech data in the first portions of the database sections 151, 152, . . . 15N with the mono-phones in the second portions of the database sections 151, 152, . . . 15N. That is, the weights of the layers 18a, 18b, 19 and 21a are gradually modified by known algorithms such that if speech items are successively input to the mel FBANK 16, the outputs of the layer 20 encode the corresponding mono-phone, in a form which can be used by the non-adaptive output layer 27 to produce the signal indicative of a single monophone.

Note that this process is carried out using training data in the database 15 for all the training speakers successively. Thus, the input network component 18, bottleneck layer 19 and output network component 21 are not trained in a way which is specific to any of the training speakers. In particular, the bottleneck layer 19 is trained to become a generic bottleneck layer (i.e. applicable for any of the training speakers). In the terminology used earlier, the trained generic bottleneck layer is a trained generic adaptive model component.

In most suitable learning algorithms, speech items are presented one-by-one to the FBANK 16, and the network parameters are modified such that the output network component 21 outputs the corresponding mono-phone.

The order in which frames from the training speakers are learnt is not important. In one possibility a randomly chosen one of the frames for the first training speaker may be input to the FBANK 16, and the network parameters are adjusted such that the output of the output network component 21 is indicative of the corresponding mono-phone. Then, the same is done with a randomly chosen one of the frames for the second training speaker. And so on, until the same is done with a randomly chosen one of the frames for the N-th training speaker. Then the entire process is repeated as many times as desired (e.g. until a convergence criterion has been reached).

The reason for using mono-phone targets for training the BN-DNN is to make the bottleneck layer training robust to transcription errors during recognition, and alleviate the problem of data sparsity. Mapping the triphone targets onto mono-phones can be interpreted as state tying, and helps alleviate the problem of data sparsity.

We now describe step 2, and steps 3 and 4. Note that step 2 is independent of steps 3 and 4. It can be performed after steps 3 and 4, or it could be performed at the same time as steps 3 and 4.

2. Training the Speaker Independent (SI) DNN (Step 2 of FIG. 1) for Recognising the Test Speaker In step 2, the trained input network component 18 and trained generic bottleneck layer 19 are used as the first stage of a two-stage adaptive network 25 shown in FIG. 4. Components with the same meaning as in FIG. 3 are given the same reference numerals. The adaptive network comprises the trained input network component 18, which receives the output of the FBANK 16), and the trained generic bottleneck layer 19. The adaptive network further comprises a "stage 2" DNN 22, comprising three layers 22a, 22b, 22c. Each layer may contain 2048 neurons, each of which forms a respective output as a function of a weighted sum of its inputs. Each neuron of the second layer 22b receives the outputs of the neurons in the first layer 22a, and each neuron of the third layer 22c receives the outputs of the neurons in the second layer 22c. Note that in variations of the example of the invention, the number of layers in the stage 2 DNN 22, and the number of neurons per layer can be different.

As in step 1, speech items for all training speakers are input successively to the FBANK 16, which feeds the first stage of the adaptive network (i.e. the trained input layer 18 and trained bottleneck layer 19). The corresponding resulting output of the bottleneck layer 19 is combined with the respective five outputs of the bottleneck layer 19 when the five succeeding frames for the same training speaker are successively input to the FBANK, and the respective five outputs of the bottleneck layer 19 when the five preceding frames for the same training speaker are successively input to the FBANK, to form a feature vector 26. Note that in variations of the example of the invention, the number of preceding and/or succeeding frames may differ from five, but five such frames were used in our experimental implementation explained below. The feature vector 26 is input to each neuron of the first layer 22a of the stage-2 DNN 22.

When a given feature vector 26 is input to the stage-2 DNN, the neurons of the stage-2 DNN 22 are modified such that the third layer 22c generates a signal indicative of the triphone centred on the speech item input to the FBANK 16. The outputs of the third layer 22c are fed to a non-adaptive output layer 28 which formats the outputs of the third stage layer 22c, to produce a signal indicative of a triphone.

This process is repeated successively for speech items for all of the training speakers.

As in step 1, the order in which the speech items for the training speakers are used is not important. In one possibility a randomly chosen one of the frames for the first training speaker may be input to the FBANK 16, and the parameters of the neurons in the stage-2 DNN 22 are adjusted such that the output of the output network 22c is indicative of the corresponding tri-phone. Then, the same is done with a randomly chosen one of the frames for the second training speaker. And so on, until the same is done with a randomly chosen one of the frames for the N-th training speaker. Then the entire process is repeated as many times as desired (e.g. until a convergence criterion has been reached).

Figure 4:
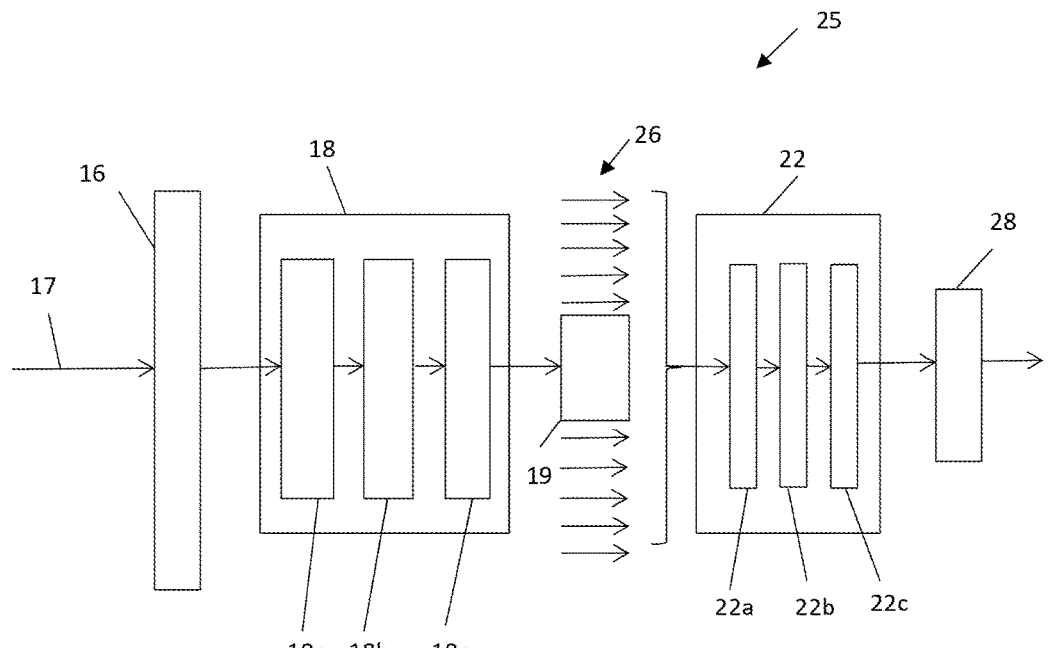
FIG. 4 illustrates a further adaptive model which is trained in a step of the method of FIG. 1.

Thus, the stage-2 DNN 22 is gradually trained to become a speaker-independent (SI) DNN. The trained adaptive system 25 of FIG. 4 is well adapted for recognising tri-phones in speech of any of the training speakers, and as described below can be used to obtain a first pass transcription of a test speaker when the phone transcriptions are not available. The speaker variability is not yet normalised.

3. Forming a Speaker-adaptive DNN Model (Steps 3 and 4 of FIG. 1)

In step 3, a respective adaptive system is formed for each of the N training speakers.

Figure 5:
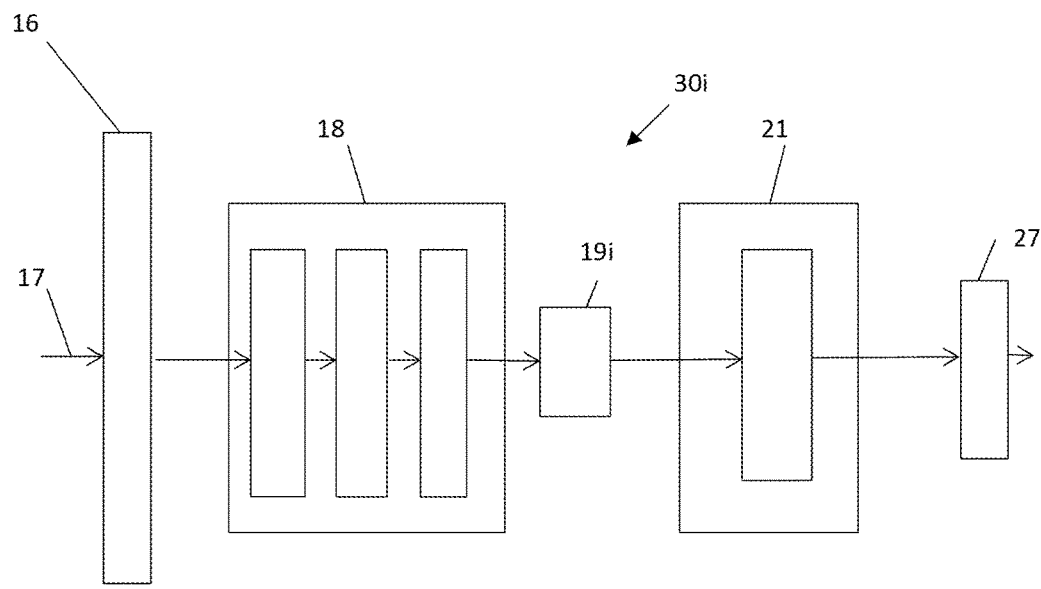
FIG. 5 illustrates a further adaptive model which is trained in a step of the method of FIG. 1.

The adaptive network 30i for the i-th training speaker is shown in FIG. 5. It receives the output of the FBANK 16, and includes the trained input network component 18 and the trained output network component 21 generated in step 1, but it further includes a bottleneck layer 19i which is different for each of the adaptive networks 30i. Optionally, the bottleneck layer 19i may initially be equal to the trained generic bottleneck layer 19 generated in step 1.

The respective bottleneck layer 19i for each adaptive system 30i is trained using only the training data in the database section 15 for the respective i-th training speaker. The trained input network component 18 and trained output network component 21 are not modified. This results in a training-speaker-specific trained bottleneck layer 19i. The training-speaker-specific trained bottleneck layers may be labelled as SDBN-1, SDBN-2, . . . , SDBN-N. The combination of the trained input network component 18 and the training-speaker-specific trained bottleneck layer 19i is a training-speaker-specific BN DNN. Again, a non-adaptive output layer 27 is provided to format the output of the output network component 21 as a signal indicating a single monophone.

This process is performed for each of the training speakers in turn.

In step 4, the N training-speaker-specific trained bottleneck layers are used to train a stage-2 DNN 32 having the same form as the stage-2 DNN 22 of FIG. 4. This training is done while the stage-2 DNN is within an adaptive system 35 shown in FIG. 6.

The stage-2 DNN 32 comprises three layers 32a, 32b, 32c. Each layer may contain 2048 neurons, each of which forms a respective output as a function of a weighted sum of its inputs. Each neuron of the first layer 32a receives the feature vector, each neuron of the second layer 32b receives the outputs of the neurons in the first layer 32a, and each neuron of the third layer 32c receives the outputs of the neurons in the second layer 22c. Again, a non-adaptive output layer 28 is provided to format the output of the layer 32c as a signal indicating a single triphone.

Figure 6:
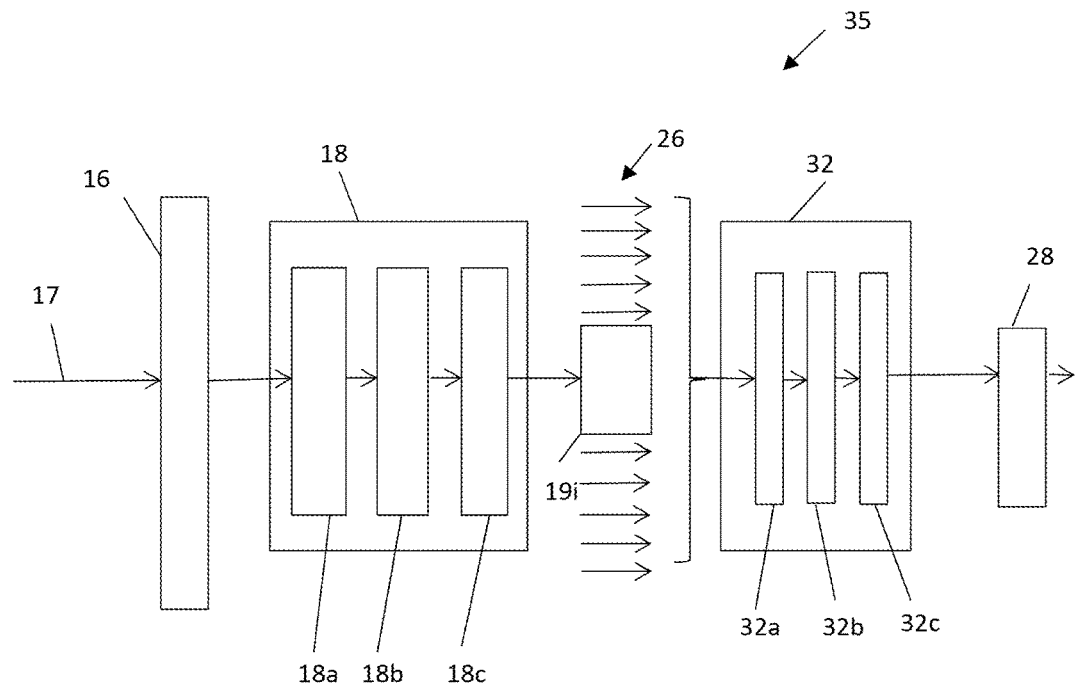
FIG. 6 illustrates a further adaptive model which is trained in a step of the method of FIG. 1.

The adaptive system 35 shown in FIG. 6 receives the output of the FBANK 16. The adaptive system comprises the trained input network component 18 formed in step 1.

As in steps 1 and 2, speech items for all training speakers are input successively to the FBANK 16. At times at which a speech item for the i-th training speaker is input to the FBANK 16, the output of the input layer 18 is fed to the i-th training-speaker-specific bottleneck layer 19i.

The resulting output of the bottleneck layer 19i is combined with the succeeding five frames and five preceding frames for the same training speaker to form a feature vector 26. This is input to the each neuron of the first layer 32a of the stage-2 DNN 32.

When a given feature vector 26 is input to the stage-2 DNN 32, the neurons of the stage-2 DNN 32 are modified such that the third layer 32c generates a signal indicative of the tri-phone centred on the speech item input to the FBANK 16.

This process is repeated successively for speech items for all of the training speakers.

The order in which the speech items for the training speakers are used is not important. In one possibility a randomly chosen one of the frames for the first training speaker may be input to the FBANK 16, and the parameters of the neurons in the stage-2 DNN 32 are adjusted such that the output of the output network 32c is indicative of the corresponding tri-phone. Then, the same is done with a randomly chosen one of the frames for the second training speaker. And so on, until the same is done with a randomly chosen one of the frames for the N-th training speaker. Then the entire process is repeated as many times as desired (e.g. until a convergence criterion has been reached).

Thus, the stage-2 DNN 32 is gradually trained to become recognise tri-phonemes from the data output by any of the training-speaker-specific BN DNNs. This is in contrast to the stage-2 DNN 22 generated in step 2, which is trained to recognise tri-phonemes from the output of the trained generic BN DNN generated in step 1. The stage-2 DNN 32 is referred to below as a SAT-DNN.

4. Automatic Speech Recognition for Test Speaker (Steps 5 to 9 of FIG. 1)

We now turn to how speech from a test speaker is recognised. This step is typically performed after steps 1-4, when training data from the test speaker become available. It employs; the trained input network component 18 and the trained output network component 21 generated in step 1; the adaptive network (SI-DNN) 25 generated in step 2; and the stage-2 DNN generated in step 4. The speech from the test speaker 2 is captured by the microphone 13, and stored in the database 14. Steps 5 to 9 are typically carried out after steps 1-4, when speech from a test speaker becomes available. This is indicated by the dashed line in FIG. 1. However, in some example of the inventions steps 5-7 could be carried out before steps 3 and 4, or at the same time.

In step 5, the adaptive network 25 (produced in step 2) is used to generate a "first-pass" recognition of the tri-phones in the captured speech of the test speaker. The result is reasonably accurate.

In step 6, the tri-phones derived in step 5 are converted into mono-phones. Note that this is an optional step of the method; the method can alternatively be performed entirely using triphones. This process also shows the alignments of the mono-phones with the captured speech of the test speaker (i.e. the time at which each mono-phone begins). Thus, the training data for the test speaker in the database 14 is divided into frames.

Figure 7:
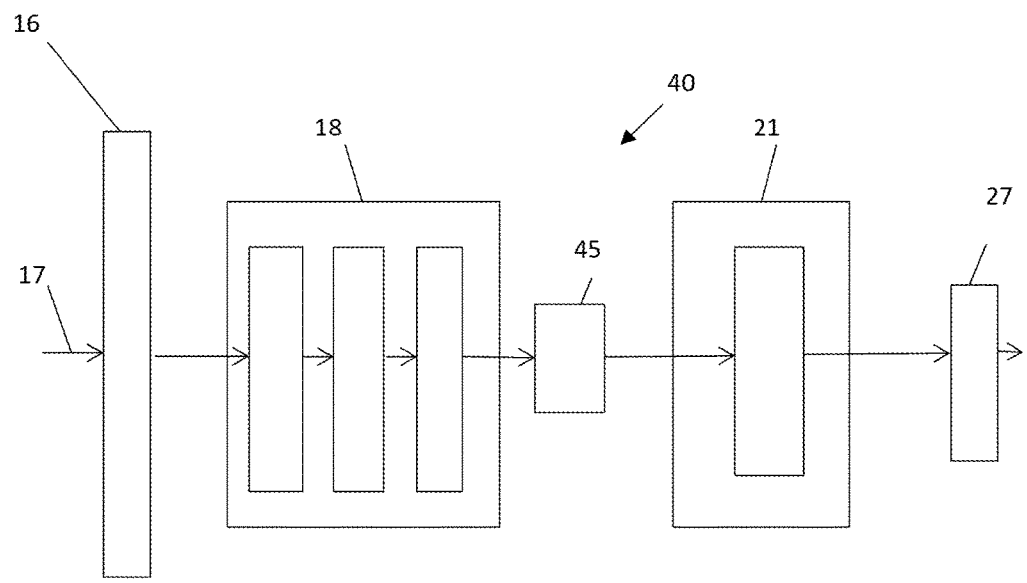
FIG. 7 illustrates a further adaptive model which is trained in a step of the method of FIG. 1.

In step 7, an adaptive system 40 shown in FIG. 7 is formed. It receives the output of the FBANK 16, and includes the trained input network component 18, a new bottleneck layer 45 (which optionally may initially be equal to the trained generic bottleneck layer 19 generated in step 1), and the trained output network component 21. Again, a non-adaptive output layer 27 is provided to format the output of the output network component 21 as a signal indicating a single monophone.

Then a learning procedure is performed, in a way similar to step 3, by successively inputting speech items from the database 14 into the FBANK 16 of the adaptive system 40 and modifying that bottleneck layer 45 such that the output of the output network component 21 is the corresponding mono-phone obtained in step 6.

Thus, the bottleneck layer 45 is trained to be a test-speaker-specific bottleneck layer. Note that the number of variable parameters associated with the bottleneck layer is much smaller than the number of variable parameters associated with the input network component 18 or output network component 21, so a much smaller amount of training data is required to fix the parameters of the bottleneck layer 45 than was required in step 1. Thus, the required captured speech of the test speaker is low. In particular, the training of the bottleneck layer 45 is performed with mono-phones, not tri-phones, which reduces the amount of captured speech of the test speaker required to train the test-speaker-specific bottleneck layer 45.

Figure 8:
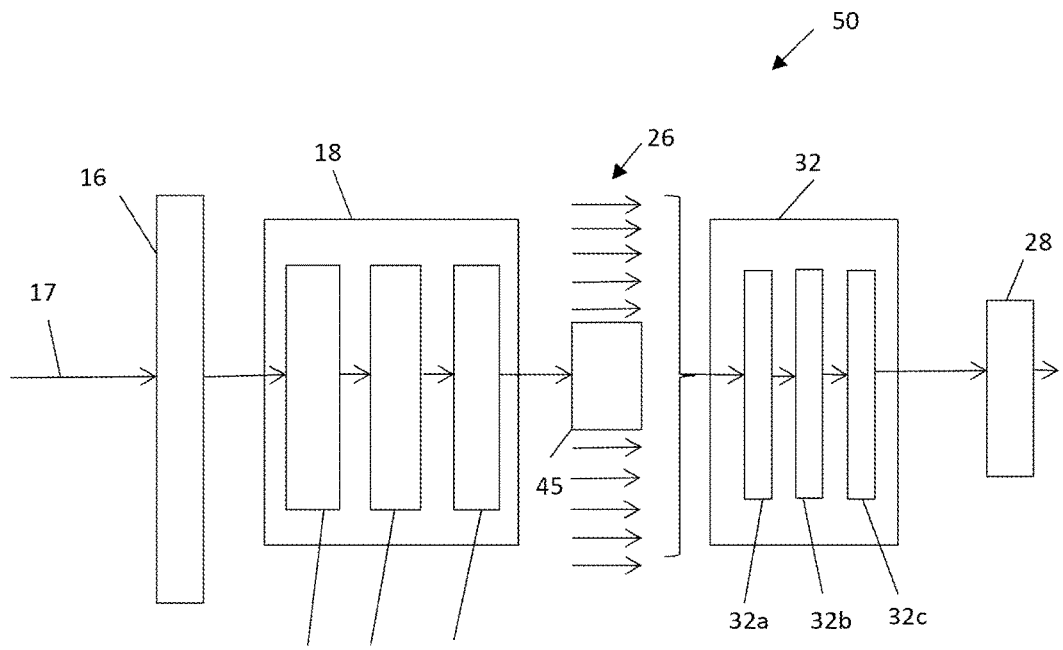
FIG. 8 illustrates a further adaptive model which is trained in a step of the method of FIG. 1.

In step 8, a test-speaker specific adaptive system 50 shown in FIG. 8 is formed. It is used to recognise speech from the test speaker collected by the microphone 13. The output of the microphone is transmitted to the FBANK 16, and the output of the FBANK 16 is transmitted to the input network component 18 which is the first part of the test-speaker specific adaptive system 50. Specifically, the test-speaker specific adaptive system 50 includes the trained input network component 18, the trained test-speaker-specific bottleneck layer 45 and the stage-2 DNN 32 generated in step 4 (the speaker-adaptive output network). This test-speaker-specific adaptive system 50 can be used to recognise tri-phones in speech captured by the microphone 13. Again, a non-adaptive output layer 28 is provided to format the output of the layer 32c of the stage-2 DNN 32 as a signal indicating a single triphone.

Note that the output from the test-speaker-specific bottleneck layer 45 when a certain frame is input to the FBANK 16 is combined with the five respective outputs of the bottleneck layer 45 when each of the 5 frames before that frame is successively input to the FBANK, and the five respective outputs of the bottleneck layer 45 when each of the 5 frames after the frame is successively input to the FBANK, to generate the input to the stage-2 DNN 32.

The method of FIG. 1 does not require a priori-information about the phonemes spoken by the test speaker: these are recognised in an approximate fashion in step 5, so that supervised learning can be performed in step 7. In other words, although the method as a whole performed in steps 5-8 is unsupervised (in the sense that no a priori information is available about the phones spoken by the test speaker), step 7 can be regarded as a supervised step.

Optionally, the system may determine (in step 9) that a certain amount of time has passed. After this, new training data for the training speaker is collected, and then converted into triphones using the existing test-speaker-specific adaptive system. The steps 6-8 are then repeated. This would produce a replacement test-speaker-specific adaptive system, incorporating a replacement test-speaker-specific bottleneck layer. The replacement test-speaker-specific adaptive system would cope, for example, with possibility that the acoustic environment of the test speaker has changed since the steps 5-8 were first performed.

Note that an alternative to converting the new training data for the test speaker into triphones using the existing test-speaker-specific adaptive system in step 9, would be to use the SI-DNN of FIG. 4 to convert the new training data for the test speaker into triphones. Then steps 6-8 would be repeated as described in the preceding paragraph.

The process of generating a replacement test-speaker-specific adaptive system may be performed at intervals indefinitely, and/or upon receiving a control signal (e.g. from the test speaker) indicating that it would be beneficial to repeat them because the accuracy of the existing test-speaker-specific adaptive system is insufficient.

In a variation of this concept, steps 5-8 may be repeated upon some other criterion being met. For example, the ASR system might include a component for determining the characteristics of noise in the sound received by the microphone 13, and steps 5-8 may be repeated upon a determination that the noise characteristics of sound received by the microphone 13 have changed by more than a pre-determined amount.

Note that if, in a variation of the method 100, training data from the test speaker is available in which, for items of captured speech of the test speaker, corresponding mono-phonemes spoken by the test speaker are identified, step 2, 5 and 6 could be omitted. The training data relating to the test speaker could be employed in step 7 to generate the test-speaker-specific bottleneck layer 45, by performing supervised learning of the bottleneck layer 45 within the adaptive network 40 using the training data relating to the test speaker.

As will be clear, the adaptive networks 20, 25, 30i, 35, 40 and 50 are implemented virtually in a memory space of the computer system 10.

It is not necessary for the steps 1-8 to be performed by the same computer system or at substantially the same time. Rather, steps 1-4 could optionally be performed by a first computer system, e.g. using very large amount of training data relating to the training speakers, and then steps 5-9 could be performed by a second computer system (e.g. with a different human operator) when data for a test speaker is available.

In a variation of the adaptive models of FIGS. 3, 5, and 7, the output layer network 21 may be omitted from certain embodiments of the invention, such that the bottleneck layers 19, 19i, 45 are trained to produce outputs which are directly indicative of the monophone corresponding to the speech item input to the FBANK. The non-adaptive output layer 27 would format the output of the bottleneck layers 19, 19i, 45 to generate a signal indicating a single monophone.

Note that it is not essential in method 100, that the training data for the training speakers stored in the database sections 151, 152, . . . 15N is free of noise. It may alternatively be chosen to be subject to noise, such as noise resembling a possible noise environment of the test speaker.

B Method 200

A method 200 which is a further example of the invention is illustrated in FIG. 9. FIG. 9 differs from FIG. 1 in that three additional steps 1a, 1b and 1c are performed. As illustrated in FIG. 1, these are performed after step 1, but steps 1a and 1b could alternatively be performed before step 1, and indeed, as discussed below, step 1a could be omitted.

In step 1a, the noise environment of the test speaker is measured, to produce a measured noise characteristic. This may be done, for example by collecting sound data from the microphone 13 prior to (or after) the test speaker speaks.

In step 1b, the measured noise environment is used to obtain a set of training data for each of the training speakers ("noisy training data") which has a noise characteristic similar to the measured noise characteristic. For example, if the training data for each of the training speakers stored in the respective database sections 151, 152, . . . , 15N includes portions with different respective noise characteristics, a portion having a noise characteristic similar to the measured noise characteristic is selected. The noisy training data is stored in an additional database (not shown in FIG. 2) within the data storage system 12.

In step 1c, step 1 is repeated using the noisy training data obtained in step 1b, but only the final layer of the input network component is modified. That is, the network is as shown in FIG. 3 is used again, but only the layer 18c of the trained input network component 18 is modified in step 1c. Optionally, the trained generic bottleneck layer 19 may be modified (updated) also as part of step 1c. In the experiments reported below, the generic bottleneck layer is updated.

Optionally, the noisy training data generated in step 1b may also be used in steps 2-4. Whether this is appropriate depends on the amount of noisy data available.

Once step 9 is completed, the method 200 loops back to step 1a. In a variation, the measurement of the noise environment of the user can be performed as part of step 9 before or after the collection of the new speech data from the test user. In this case, the method may alternatively loop back, after step 9, to step 1b instead of step 1a.

Note that whereas in method 100, steps 1-4 can be performed in advance of any information about the test speaker or his or her noise environment, in step 1a of method 200 the noise environment of the test speaker is measured. In other words, method 200 may require more computational processing to be carried out following collection of sound at the location of the test speaker.

In a variation of method 200, step 1a may be omitted, and instead in step 1b the noisy training data is obtained based on an estimate of the noise environment of the test speaker.

In another variation of the method 200, step 2 (the formation of the SI-DNN) and steps 3 and 4 (the formation of the training-speaker-adaptive DNN (SAT-DNN)) may be performed using the input network generated in step 1, rather than with the input network as modified 1c. In other words, steps 1, 2, 3 and 4 are performed just as in method 100. In this case, steps 2, 3 and 4 can optionally be performed before steps 1a-1c. Steps 2, 3 and 4 may thus be performed before the recognition stage of the method of FIG. 9 begins (e.g. when no information about the test speaker, or perhaps even the noise environment of the test speaker, is available).

Figure 10:
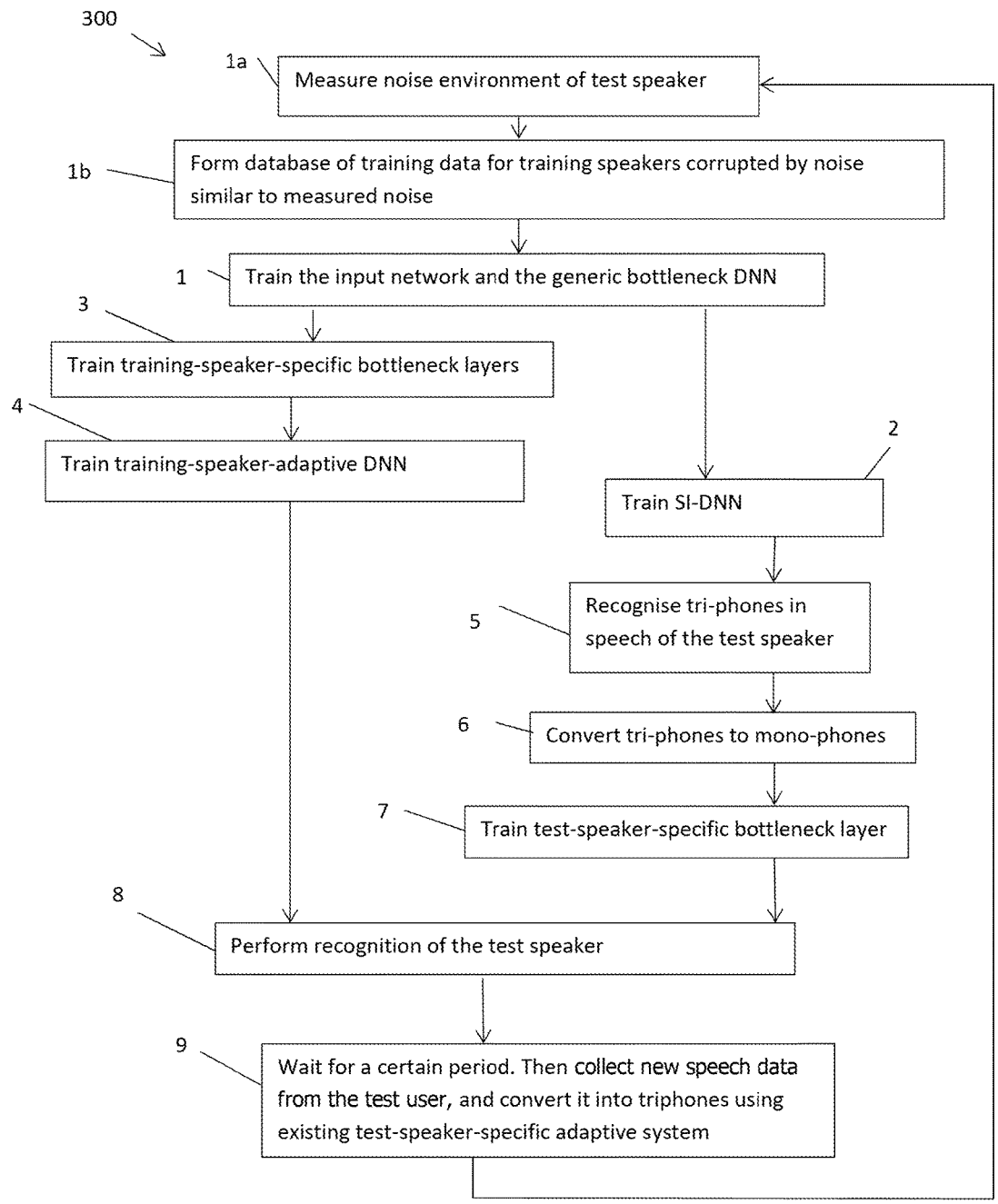
FIG. 10 is a flow diagram of a third method to produce a test-speaker-specific adaptive system.

Note that if an unlimited amount of noisy training data for the training speakers is available, the process of method 200 may be simplified, for example as shown in FIG. 10. This illustrates a method 300 in which step 1 of the training the generic bottleneck and the input network is performed following steps 1a and 1b, and no separate step 1c is needed. In this case, step 1b would have to produce enough noisy training data for step 1 to train both the input network and the generic bottleneck layer.

C Use of the Generic Bottleneck Layer in the Training-Speaker-Adaptive DNN

A second possible variation of the method 100, which may be used in combination with the first variation, is to perform step 4 of generating the stage-2 DNN 32 using not only the training speaker specific bottle neck layers 19i generated in step 3, but also the generic bottle neck layer 19 generated in step 1. The adaptive network 35 of FIG. 6 is replaced in this case by an adaptive network 35' illustrated in FIG. 11, in which the resulting stage-2 DNN is labelled 32'. It may for example be composed of three layers 32a', 32b' and 32c'.

During the training procedure of step 4, whenever a given training example for a given i-th training speaker is input to the FBANK 16, the output of the trained input network component 18 is passed not only to the corresponding bottleneck layer 19i but also to the generic bottleneck layer 19. The respective outputs of the bottleneck layer 19i and generic bottleneck layer 19 are concatenated to form a data vector which is input to the stage-2 DNN 32'.

Figure 11:
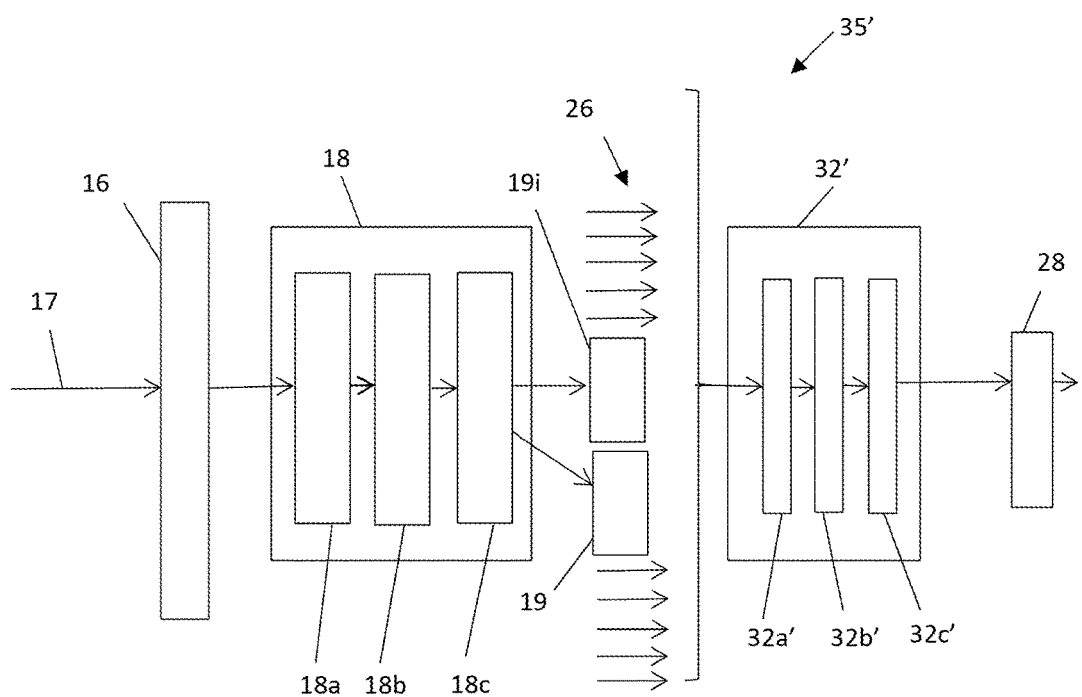
FIG. 11 is an adaptive model which is used in a variation of the method of FIG. 1 or FIG. 9, to replace the adaptive model of FIG. 6.

Similarly, the test-speaker-specific adaptive system 50 used in step 8 (and shown in FIG. 8) is replaced with a test-speaker adaptive system 50' illustrated in FIG. 11. Specifically, the test-speaker specific adaptive system 50' includes the trained input network component 18, the trained test-speaker-specific bottleneck layer 45 and the stage-2 DNN 32' generated in the revised form of step 4. This test-speaker-specific adaptive system 50' is used in step 8 to recognise tri-phones in speech of the test speaker captured by the microphone 13. Again, a non-adaptive output layer 28 is provided to format the output of the layer 32c' of the stage-2 DNN 32' as a signal indicating a single triphone.

D Results

1. Method 100

Table 1 below shows the performance of the method 100 described above when using the unsupervised mode of adaptation illustrated in FIG. 1, as compared to some conventional neural network algorithms. As noted above, first-pass ASR (error full) transcription (performed in step 5) is used for generating training data for updating the weights of the bottleneck layer 45 in step 7. In step 8, a test-speaker-specific network is formed for recognising triphones, and using known algorithms the triphones are converted to words.

The training data was clean and multi-condition training data consisting of 7137 utterances from 83 speakers. It is referred to here as the Aurora4 database. The clean data was recorded using a primary Seenheiser microphone, whereas the multi-condition training data had data recorded with a primary microphone and a secondary microphone which includes convolutive distortions. The multi-condition data further included data having additive noise from six noise conditions: airport, babble, car, restaurant, street and train station.

The test data consisted of 14 test sets, including 330 utterances from 8 test speakers, recorded by two different microphones.

The FBANK was a 40-dimensional mel FBANK. Thus, since the bottlenecks produced a 75 dimensional output, the input to each of the stage-2 DNNs 22, 32 was a 825 dimensional feature vector 26. The stage-2 DNNs 22, 32 were trained to produce a signal indicative of one of 2281 triphones. RBM (Restricted Boltzmann machine) pre-training was performed, and optimized using a cross-entropy criterion.

Table 1 shows, in the second row, the performance (i.e. percentage word error rate, % WER) of the example of the invention in the case that the FBANK 16 is a mel FBANK. Rows 3-5 respectively show the performance of the example of the invention when the mel FBANK is supplemented with a D-vector unit, a CMLLR unit, and both a CMLLR unit and a D-vector unit. The final column of Table 4 compares the performance of each of these examples of the invention with a baseline which is the performance of the SI system shown in FIG. 4 which does not have a speaker-specific bottleneck layer.

TABLE 1

| % WER | Baseline | Example of the invention | % WERR |
|---|---|---|---|
| FBANK | 14.5 (SIBN) | 13.2 | 8.9 |
| +D-vec | 13.9 | 12.7 | 8.6 |
| +CMLLR | 12.6 | 11.3 | 10.3 |
| +CMLLR + D-vec | 11.9 | 11.2 | 5.9 |

The CMLLR transforms were estimated while training a SAT (speaker adaptive training) GMM-HMM model (Gaussian mixture model-Hidden Markov model). D-vectors were obtained by training a bottleneck DNN with speaker labels as targets in the output layer. In the experiments, the D-vectors were obtained by averaging the output of the bottleneck layer over an utterance, and then appending the constant vector to the filterbank features in the utterance. This means that the speaker representation is allowed to change across utterances from the same speaker.

One can observe that the proposed approach when applied on top of DNN trained with Mel filter-bank (FBANK) features provides a relative gain (% WER reduction, or "% WERR") of 8.9% in terms of word error rate (WER). A relative gain of 8.6% is observed when applied to a DNN trained with FBANK features appended with D-vectors. The best performance is achieved when the speaker adaptive DNN is applied on top of a DNN trained with FBANK features transformed with CMLLR feature transforms. The performance seems to saturate when CMLLR-FBANK is appended with D-vectors.

Instead of appending the D-vectors to the FBANK features, we tried, in another experiment, appending them to the bottleneck features before training the second stage DNN. This provided broadly similar gains in performance. No gain in performance was observed when D-vectors were appended to both the FBANK features and the bottleneck features.

We also studied the influence of reducing the number of neurons in the input network component. The motivation for this was to see whether it would be possible to reduce the number of parameters of the bottleneck layer which need to be adapted with the bottleneck layer is trained. We performed experiments in which each layer of the input network component was reduced to 256 neurons. This gave a slight reduction in performance. Accordingly, using a larger size for the layers of the input network component might give an improvement in performance.

Supervised adaptation experiments, where true transcripts of the test speaker training data are used for updating the weights of the BN layer in step 7 are shown in Table 2. In other words, the following results are the result of the variation mentioned above in which steps 2, 5 and 6 are not required. Again, the baseline is the system shown in FIG. 4, which is the baseline shown in Table 1.

TABLE 2

| % WER | +10 | +20 | +30 | +40 |
|---|---|---|---|---|
| FBANK | 13.4 | 12.7 | 12.3 | 11.9 |
| +D-vec | 13.1 | 12.1 | 11.9 | 11.6 |
| +CMLLR | 11.5 | 11.1 | 10.8 | 10.4 |
| +CMLLR + D-vec | 11.4 | 10.8 | 10.5 | 10.4 |

The columns indicate the number of utterances used per speaker to update the weights. Comparing both the tables, one can notice that using as few as 10 utterances (which correspond to one minute of audio) to update the weights of the bottleneck layer seems to improve the performance over the baseline. It is interesting to note that less adaptation data is required to achieve a similar or better performance if the data is normalised with CMLLR or D-vectors, compared to using only FBANK features. This may be because a better acoustic model was trained in the SAT framework. Also, we note that using D-vectors in combination with CMLLR-FBANK features seems to give little improvement over using only CMLLR-FBANK features.

2. Further Experimental Results 2.1 Corpus Description

Further experimental results, relating to the method 200 (Section B above) and to the use of the trained generic bottleneck layer in the training-speaker-adaptive DNN (Section C above), are given below. These experimental results use the Aurora4 and CHIME3 databases (the CHIME 3 database was also used in J. Barker, R. Marxer, E. Vincent, and S. Watanabe, "The third 'chime' speech separation and recognition challenge: Dataset, task and baselines." in IEEE Automatic Speech Recognition and Understanding Workshop (ASRU 2015), December 2015). Both Aurora4 and CHIME3 corpus are derived from the WSJ0 corpus (J. Garofalo, D. Graff, D. Paul, and D. Pallett, "CSR-I (WSJ0) Complete, LDC93S6A. DVD. Philadelphia: Linguistic Data Consortium, 1993.")

The CHIME3 corpus is recorded using a multi-microphone tablet device in both real and simulated noisy environments. The environments where the recording were done include café, street, bus and restaurant. The data includes both real recording as well artificially adding the simulated noise to clean speech signals.

The training data includes the clean data from the WSJ0 corpus and has 7138 utterances with 83 speakers. It also includes 1600 real noisy utterances, four speakers each reading 100 utterances in each of the four environments. The data is also supplemented with 7138 simulated utterances using WSJ0 clean speech data. In total there are 15876 training utterances with 431 speakers. The speakers are split not only by speaker label, but also by the environment label. The test set provides both development and evaluation sets with 4 speakers each. The results below were obtained using only the evaluation set, which has 1320 utterances with 330 utterances from each speaker for both real and simulated noise environments. The test set will also include the clean speech from the WSJ0 corpus. For the experiments, the speech data recorded from Channel 5 is used for training and evaluations. Multi-channel data is not used for the experiments.

2.2. Acoustic Modelling

As noted above, step 1 of the method is performed using the adaptive model (BN-DNN) 20 of FIG. 3. The input network component 18 has three hidden layers. The output layer 21 has one hidden layer with monophones as targets. Each hidden layer consists of 512 nodes and uses sigmoid activations. The bottleneck layer 19 has 75 nodes, as have the bottleneck layers 19*i* in step 3. The BN-DNN is trained using Mel filter-bank (FBANK) features having 40 dimensions, which are spliced across 11 frames forming an input vector of size 440. Cross-entropy training criterion is used for training the BN-DNN.

In steps 2 and 4, the stage-2 DNN 22, 32 consists of three hidden layers with 2048 nodes in each layer for the Aurora4 task and 1024 nodes in each layer for the CHIME3 task. All the layers use sigmoid activations. The stage-2 DNN 22, 32 is trained using BN features having 75 dimensions, that are also spliced with 11 frames forming a vector of size 825. The second-stage acoustic model is optimised using cross-entropy (CE) for Aurora4, while we perform sequence (sMBR) training on the CHIME3 task. All the experiments use FBANK features as input to the DNNs without any transformation on the features to compensate for the variabilities.

2.3. Experiments and Baseline Results

The experiments include performing recognition (i.e. the test phase of the experiments) on the Aurora4 task (i.e. with Aurora 4 data as the test data) using models trained on Aurora4 and CHIME3 corpus. These experiments help us understand how the ASR performance changes when using models trained with matched and mis-matched noise conditions. In both cases, multi-condition training is employed. Since we intend to perform both speaker and noise adaptation, we believe that having a mis-matched scenario helps us evaluate the effectiveness of the proposed adaptation methods better. The other set of experiments include evaluating the CHIME3 test sets, that includes simulated (SN) and real (RN) noise test sets. We also report results on the clean set provided with WSJ0 corpus. The results reported for Aurora4 are the average % WER (word error rates) of all the 14 test sets. Similarly, the results reported on CHIME test sets for simulated noise (SN) and real noise (RN) conditions are the average of the 4 noise conditions.

Table 3 presents results for the performance of speaker independent (SI) model 25 resulting from step 2, without any adaptation to speaker or environment. This is referred to as SIBN. From the table, one can observe how the SI model performance of Aurora4 changes using models trained with matched and mismatched noise conditions. One can notice that there is huge degradation in performance when the models are trained with mismatched noise conditions. The baseline performance on CHIME3 tasks does not match the results presented in [24], as we include clean training data from the WSJ0 corpus and only use FBANK features (without FMLLR) for training the DNN model.

TABLE 3

Baseline ASR performance on Aurora4 and CHIME3 tasks using the SI-DNN 25 and the test-speaker-specific adaptive model 50

| | Train | | | | |
|---|---|---|---|---|---|
| | Aurora4 (CE) | CHIME3 (sMBR) | | | |
| Test | Aurora4 | Aurora4 | Clean | SN | RN |
| SIBN | 14.5 | 33.9 | 2.7 | 22.4 | 38.0 |
| SDBN | 13.2 | 26.9 | 2.2 | 17.7 | 35.1 |

Table 3 also presents results for speaker adaptation using the test-speaker-specific adaptive model 50, labelled "SDBN". The second column shows results when the Aurora 4 corpus is used in both the training and the test phase. The third to sixth columns show respectively the results when the CHIME 3 database is used for the training, and the test phase is carried out respectively using the Aurora4 corpus, and using clean data from the CHIME3 database, simulated noise (SN) from the CHIME3 corpus and real noise (RN) from the CHIME3 corpus.

The adaptation is performed in a unsupervised manner using a two-pass approach. All the utterances from the test speaker are used for tuning the weights of the BN-layer. One can observe that in all cases, SDBN has improved ASR performance when compared with SI ASR model trained using SIBN features. For the discussion in the rest of the paper, SDBN results are used as a baseline.

TABLE 4

Comparison of the performance of the adaptive model 50 produced by method 100 (SDBN) and method 200 (NDSDBN)

| | Train | | | | |
|---|---|---|---|---|---|
| | Aurora4 | CHIME3 | | | |
| Test | Matched | Aurora4 | Clean | SN | RN |
| SDBN | 13.2 | 26.9 | 2.2 | 17.7 | 35.1 |
| NDSDBN | 12.2 | 23.5 | 2.1 | 17.3 | 34.8 |

The results of the method 200, and a variation of it, are presented in Table 4, in comparison with the method 100 (the row marked SDBN). The performance of the adaptive model 50 produced in the case of method 200 and its variation is referred to as NDSDBN. Note that in all cases, the noise environment of the test speaker is not known in advance, but is estimated from the test speaker's utterances (test data).

One can observe that in all cases, NDSDBN has improved ASR performance compared with SDBN features (i.e. the adaptive model 50 produced by method 100). We observe considerable gain in performance on the Aurora4 test set when evaluated using CHIME3 corpus as training data.

The Aurora4 corpus does not provide noise label information in the training corpus. Hence when the training phase of the method (steps 1, 2, 3 and 4) is performed using the Aurora training set (first column of Table 4), the method 200 is performed according to the variation described above in which steps 2, 3 and 4 are performed using the input network produced in step 1 (as in method 100), rather than the input network as modified in step 1c. In particular, the SAT-DNN is not trained in a noise-specific way. Thus, the proposed sequential tuning of the weights (i.e. the updating of the hidden layer 18c based on noise-specific data, in combination with the formation of the bottleneck layer using test-speaker specific data) is performed only during recognition and the adaptive model 50 trained using SDBN features is used for performing recognition.

On the other hand, the CHIME3 corpus provides noise label information and hence in the case of using the CHIME3 corpus in the training phase, the SAT-DNN model is also trained using the sequential weights update described above (i.e. method 200 is performed just as shown in FIG. 9). In the case that the test phase is performed using the Aurora4 corpus (i.e. column 3 of Table 4), since there is a mismatch in noise between the training speakers and test speakers, the only way to perform steps 1a to 1c is using the test data in step 1a to estimate the noise environment of the test speaker. Once this is done, data from the test (Aurora4) corpus having substantially the same noise characteristics is extracted in step 1b (note that the CHIME3 training corpus does not have any speech samples including noise with the same characteristics as the noise environment of the test speakers of the Aurora4 corpus), and used to modify the layer 18c in step 1c. Thus, the layer 18c is modified using pooled data from the many training speakers with the same noise environment as the test speaker. Similarly, when the test phase is performed using the CHIME3 data (i.e. columns 4 to 6 of Table 4), the test data is used in step 1a to estimate the speaker's noise environment; this is used in step 1b to extract from the CHIME3 database training data with substantially the same noise environment (this is possible because the CHIME3 database does include training data with the same noise environment as that of the test speaker); and the extracted training data is used in step 1c to update the layer 18c.

The adaptation for both noise and speaker are performed in an unsupervised manner using a two-pass approach. For tuning the weights of the noise dependent layer (i.e. steps 1a to 1c), we used 400 utterances randomly chosen from all the speakers for each noise condition in the experiments using CHIME3 data for the testing, both during training and recognition. For the testing using the Aurora4 corpus, we use 330 utterances available from each of the 8 test speakers for each noise condition.

TABLE 5

Performance of the adaptive model 50 for the CHIME3 task, with matched noise in training and testing

|  | Clean | SN | RN |
|---|---|---|---|
| Unsupervised | 2.1 | 17.3 | 34.8 |
| Supervised | 2.3 | 17.7 | 31.1 |

Note that in the CHIME3 corpus, we have the same noise conditions both in training and recognition (testing) and the corpus is also provided with noise label information. In such a scenario, we can perform an experiment to see if the noise dependent layer already estimated on the training set can be used during recognition. The idea is to perform method 200 using a pre-estimated noise dependent layer (that is, layer 18c in FIG. 4) and only tune the weights of the BN-layer 45 with test speaker specific data.

Table 5 presents the results using the CHIME3 data for both training and recognition, and compares supervised and unsupervised learning. The second row of Table 5 is the same as part of the last row of Table 4, and the third row shows corresponding results using supervised learning. One can observe that the performance for clean and simulated noise (SN) are very close either using a supervised (training set) or unsupervised (test set) estimation of the noise dependent layer 18c. Only the real noise (RN) condition benefits from the supervised adaptation. This might be due to high % WER for the RN scenario.

Figure 12:
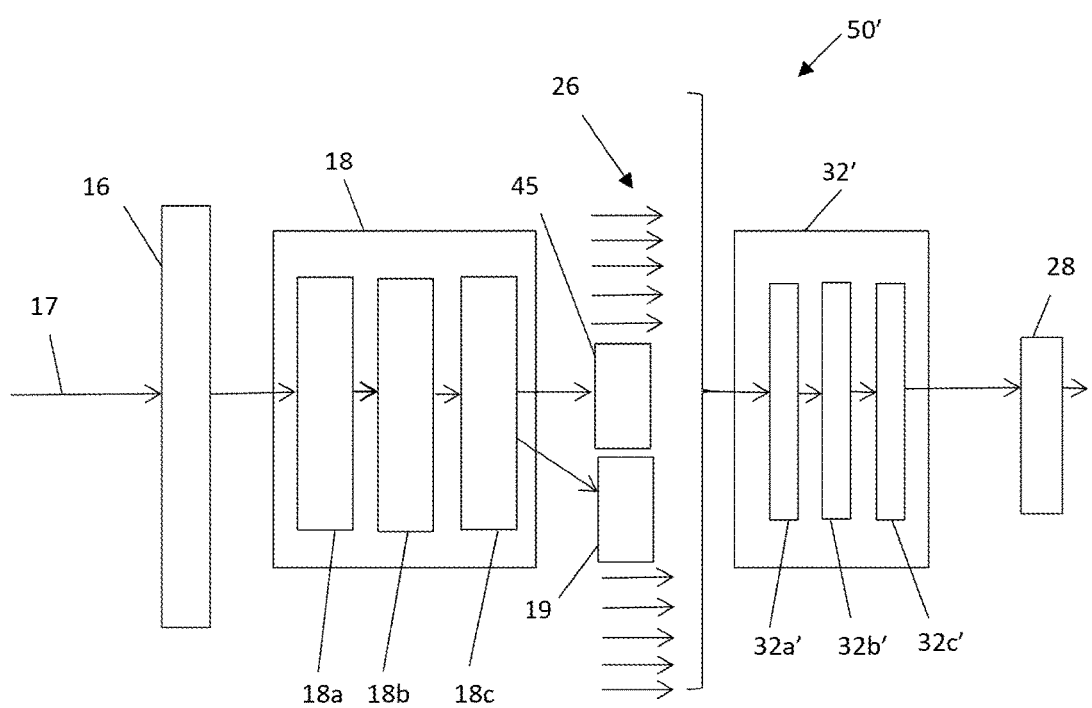
FIG. 12 is an adaptive model which is used in the variation of the method of FIG. 1 or FIG. 9, to replace the adaptive model of FIG. 8.

The results using the network 50' of FIG. 12 are presented in Table 6. The case that the adaptive model 50' is trained using the method 100 is labelled SIBN-ESDBN. From the table, one can notice that the adaptive model 50' seems to perform better than the adaptive model 50. It seems that presenting both the features output by the test-speaker-dependent bottleneck 45 and the generic bottleneck 19 allows the adaptive model 50' to learn characteristics of the speaker which might not be evident from just the features output by the test-speaker-dependent bottleneck 45. We presume that the network is able to contrast features output by the bottleneck layers 19, 45 for learning the speaker characteristics.

Table 6 also shows the results when the adaptive model 50' of FIG. 12 is trained using the method 200. This is referred to as SIBN+NDSDBN. One can observe that the use of the SIBN features (output by the bottleneck layer 45) and the NDSDBN features output by the generic network in the case that the last layer 18c of the input network component 18 has been trained using noise as in method 200, provides the best performance, where both speaker and background noise are compensated for. It is important to note that we have not introduced any new information into the network and only changed the way the second-stage model is trained. Note that the SDBN features change for each frame and are not fixed for each speaker.

TABLE 6

Performance of the adaptive models 50 trained by method 100 (SDBN) and 200 (NDSDBN), with the adaptive model 50' trained by method 100 (SIBN + SDBN) and method 200 (SIBN + NDSDBN), on the Aurora4 and CHIME3 tasks.

| | Train | | | |
|---|---|---|---|---|
| | Aurora4 | CHIME3 | | |
| Test | Matched | Aurora4 | Clean | SN | RN |
| SDBN | 13.2 | 26.9 | 2.2 | 17.7 | 35.1 |
| NDSDBN | 12.2 | 23.5 | 2.1 | 17.3 | 34.8 |
| SIBN + SDBN | 12.6 | 23.5 | 2.1 | 16.2 | 33.8 |
| SIBN + NDSDBN | 11.8 | 21.3 | 2.1 | 16.1 | 32.6 |

Experiments were also performed to determine changes in the performance of the different adaptation approaches presented above with the number of adaptation utterances used for tuning the weights. The experiments are performed on the Aurora4 test set and are evaluated used the models trained on CHIME3 corpus. Table 7 presents the results by changing the number of utterances used for updating the weights of BN-layer as well as the number of utterances used for tuning the weights of the noise dependent layer. All the experiments are performed using unsupervised adaptation following a two-pass approach.

TABLE 7

The variation of the performance of the various techniques explained above with the number of adaptation utterances used for updating noise and the speaker-dependent bottleneck layers

| | Utterances | Utterances for speaker | | | |
|---|---|---|---|---|---|
| Utt. for speaker | for noise | 10 | 20 | 30 | 40 (all) |
| SDBN | | 32.1 | 30.7 | 28.2 | |
| SIBN + SDBN | | 27.9 | 26.3 | 25.6 | 26.9 |
| NDSDBN | 330 | 24.1 | 23.9 | 23.9 | 23.5 |
| SIBN + NDSDBN | 330 | 22.0 | 21.7 | 21.7 | 21.3 |
| SIBN + NDSDBN | 25 | 24.1 | 23.6 | 23.4 | |
| SIBN + NDSDBN | 50 | 23.7 | 23.2 | 23.0 | |
| SIBN + NDSDBN | 100 | 23.4 | 22.8 | 22.8 | |
| SIBN + NDSDBN | 200 | 22.8 | 22.3 | 22.3 | |
| SIBN + NDSDBN | 330 (all) | | | | 21.3 |

We make the following observations:
 As the number of adaptation utterances increases, both for tuning the weights of the noise dependent layer as well as for the speaker dependent layer, the performance gradually improves. For comparison, the results presented in Table 6 use 40 adaptation utterances from each speaker.
 The performance of the adaptive model 50' (SIBN+SDBN) using as few as 10 utterances is already better than using 30 utterances for the adaptive model 50 (SDBN). We believe that concatenating the features provides robustness to the SAT-DNN model.
 Training the model 50' with noise according to method 200 (i.e. inputting both SIBN+NDSDBN features into the stage-2 DNN 32) using 25 utterances for training the noise dependent layer 18c and 10 utterances for updating the weights of the speaker dependent layer 45, seem to perform better than the model 50' trained without noise by method 100 using 30 utterances.

While certain arrangements have been described, these arrangements have been presented by way of example only, and are not intended to limit the scope of the inventions. Indeed, the methods and systems described herein may be embodied in a variety of other forms; furthermore various omissions, substitutions and changes in the form of the methods and systems described herein may be made.

The invention claimed is:

1. A method for generating a test-speaker-specific adaptive system for recognising sounds in speech spoken by a test speaker, the method employing:
for each of a plurality of training speakers, a respective set of first training data comprising (i) data characterizing speech items spoken by the respective training speaker, and (ii) data characterizing phones for the speech items; and second training data comprising data characterizing speech items spoken by the test speaker;

the method comprising:
(a) using the sets of first training data to perform supervised learning of a first adaptive model comprising (i) an input network component and (ii) an adaptive model component, thereby training the input network component and the adaptive model component;
(b) for each of the training speakers:
(i) providing a respective second adaptive model comprising (i) the trained input network component, (ii) and a respective training-speaker-specific adaptive model component; and
(ii) modifying the training-speaker-specific adaptive model component to perform supervised learning of the respective second adaptive model using the respective set of first training data, thereby producing a respective training-speaker-specific adaptive model component;
(c) training a speaker-adaptive output network, by, successively for each training speaker, modifying the speaker-adaptive output network to train, using the respective set of first training data, a respective third adaptive model comprising the trained input network component, the respective trained training-speaker-specific adaptive model component, and the speaker-adaptive output network;
(d) using the second training data to train a test-speaker-specific adaptive model component of a fourth adaptive model comprising the trained input network component, and the test-speaker-specific adaptive model component; and
(e) generating the test-speaker-specific adaptive system as a system which comprises the trained input network component, the trained test-speaker-specific adaptive model component, and the trained speaker-adaptive output network.

2. A method according to claim 1 in which the first adaptive model further comprises an output adaptive component which is trained in step (a), the second adaptive models and the fourth adaptive model further comprising the trained output adaptive component.

3. A method according to claim 1 in which each adaptive model component is a single layer of neurons.

4. A method according to claim 1 in which said input network component comprises a plurality of layers which each comprise a plurality of neurons, and each adaptive model component comprises a smaller number of neurons than any layer of the input network component.

5. A method according to claim 1 in which said speaker-adaptive output network comprises a plurality of layers which each comprise a plurality of neurons, and each adaptive model component comprises a smaller number of neurons than any layer of the speaker-adaptive output network.

6. A method according to claim 1 further comprising, prior to step (d), a step of generating, from elements of the second training data, a corresponding first estimate of associated phones, said first estimate of the associated phones being used in step (d).

7. A method according to claim 6 in which:
in steps (a), (b) and (d), the first and second adaptive networks are trained to produce signals indicating mono-phones; and
the first estimate of the associated phones is in the form of a triphone, the method further comprising converting each of the first estimates of the associated phones into mono-phones and obtaining alignment information characterizing times at which the second training data exhibits a transition between mono-phones.

8. A method according to claim 6 in which:
in step (c), the speaker-adaptive output network is trained to produce signals indicating tri-phones; and
the step of generating from each element of the second training data a corresponding first estimate of the associated phones comprises:
training a speaker-independent network successively using training data from the training speakers, by training a fifth adaptive model comprising the trained input network component, the trained adaptive model component and the speaker-independent network, to generate triphones from the training data from the training speakers; and
inputting the second training data for the test subject into the trained fifth adaptive model, the output of the trained fifth adaptive network being the first estimate of the associated triphone.

9. A method according to claim 1 in which the input network component of the first, second, third, and fourth adaptive models receives the output of a filter bank.

10. A method according to claim 1 further comprising:
at least once repeating step (d) using replacement second training data to generate an updated test-speaker-specific adaptive model component, and
providing an updated test-speaker-specific adaptive system comprising the trained input network component, the updated test-speaker-specific adaptive model component, and the trained speaker-adaptive output network.

11. A method according to claim 1 in which, following step (a) there a step of modifying at least a part of the input network component using noise-specific training data for a plurality of the training speakers with a selected noise characteristic, the modified input network being the input network used in steps (b) to (e).

12. A method according to claim 11 further comprising measuring the noise environment of the test speaker, and obtaining the noise-specific training data with a noise characteristic selected based on the measured noise environment of the test speaker.

13. A method according to claim 11 in which the part of the input network which is modified comprises a final neural layer of the input network.

14. A method according to claim 1 in which the third adaptive model and test-speaker-specific adaptive system further comprise the trained adaptive model component, the trained adaptive model component being arranged to receive the output of the input network component and to transmit an output to the speaker-adaptive output network.

15. A method for generating a test-speaker-specific adaptive system for recognising sounds in speech spoken by a test speaker, the method employing:
(i) training data comprising speech items spoken by the test speaker; and
(ii) an input network component and a speaker adaptive output network, the input network component and speaker adaptive output network having been trained using training data from training speakers;

the method comprising:
(a) measuring a noise environment of the test speaker,
(b) obtaining noise-specific training data for a plurality of training speakers with a noise characteristic selected based on the measured noise environment of the test speaker,
(c) modifying the input network component using the noise-specific training data,
(d) using the training data to train a test-speaker-specific adaptive model component of an adaptive model comprising the modified input network component and the test-speaker-specific adaptive model component, and
(e) generating the test-speaker-specific adaptive system as a system which comprises the modified input network component, the trained test-speaker-specific adaptive model component, and the speaker-adaptive output network.

16. A method according to claim 15 in which the test-speaker-specific adaptive system further comprises a generic adaptive model component which has been trained using the sets of first training data, the adaptive model component being arranged to receive an output of the input network component, and transmit an output to the speaker-adaptive output network.

17. A method according to claim 15 further comprising:
receiving speech data encoding speech spoken by the test speaker;
passing the speech data into a filter bank; and
passing data comprising the output of the filter bank into the test-speaker-specific adaptive system.

18. A computer system for generating a test-speaker-specific adaptive system for recognising sounds in speech spoken by a test speaker, the computer system comprising:
a processor; and
a data storage device which stores
for each of a plurality of training speakers, a respective set of first training data comprising (i) data characterizing speech items spoken by the respective training speaker, and (ii) data characterizing phones for the speech items;
second training data comprising data characterizing speech items spoken by the test speaker;
an input network component and a speaker-adaptive output network; and
program instructions operative, when implemented by the processor, to cause the processor to:
(a) measure a noise environment of the test speaker,
(b) obtain noise-specific training data for a plurality of training speakers with a noise characteristic selected based on the measured noise environment of the test speaker,
(c) modify the input network component using the noise-specific training data,
(d) use the second training data to train a test-speaker-specific adaptive model component of an adaptive model comprising the modified input network component and the test-speaker-specific adaptive model component, and
(e) generate the modified test-speaker-specific adaptive system as a system which comprises the input network component, the trained test-speaker-specific adaptive model component, and the speaker-adaptive output network.

* * * * *